US012774684B2

(12) United States Patent
Fowler

(10) Patent No.: US 12,774,684 B2
(45) Date of Patent: Oct. 27, 2026

(54) SYSTEMS AND METHODS FOR STARTING A GAS TURBINE ENGINE

(71) Applicant: Raytheon Technologies Corporation, Farmington, CT (US)

(72) Inventor: Robert Bruce Fowler, Jupiter, FL (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/123,260

(22) Filed: Mar. 18, 2023

(65) Prior Publication Data

US 2023/0296058 A1 Sep. 21, 2023

Related U.S. Application Data

(60) Provisional application No. 63/321,631, filed on Mar. 18, 2022.

(51) Int. Cl.
*F02C 9/28* (2006.01)
*F02C 7/264* (2006.01)

(52) U.S. Cl.
CPC ................ *F02C 9/28* (2013.01); *F02C 7/264* (2013.01); *F05D 2220/323* (2013.01); *F05D 2220/50* (2013.01); *F05D 2260/85* (2013.01); *F05D 2270/3011* (2013.01); *F05D 2270/303* (2013.01)

(58) Field of Classification Search
CPC ............. F02C 7/268; F02C 7/264; F02C 7/26
See application file for complete search history.

(56) References Cited

U.S. PATENT DOCUMENTS 4,627,234 A * 12/1986 Schuh ................. F04D 27/0207 60/786
7,168,254 B2 1/2007 Riley
9,086,018 B2 7/2015 Winston
2003/0056521 A1* 3/2003 Dewis ..................... F02C 7/264 60/778
2011/0072879 A1* 3/2011 Bellis ................. G01N 33/0006 73/1.06

(Continued)

FOREIGN PATENT DOCUMENTS

CN 110645103 B 1/2021
WO 2019129084 A1 7/2019

OTHER PUBLICATIONS

European Search Report for 23162980.9 dated Aug. 1, 2023.

*Primary Examiner* — Katheryn A Malatek
(74) *Attorney, Agent, or Firm* — Getz Balich LLC

(57) ABSTRACT

An operating method is provided during which a plurality of start parameters for a gas turbine engine are determined. A first of the start parameters is indicative of a temperature of air at an inlet into the gas turbine engine. A second of the start parameters is indicative of a pressure of the air at the inlet. Rotation of a rotating assembly of the gas turbine engine is driven. The rotating assembly includes a compressor rotor and a turbine rotor. The compressor rotor is within a compressor section of the gas turbine engine. The turbine rotor is within a turbine section of the gas turbine engine. Fuel is directed into a combustion chamber of the gas turbine engine based on the start parameters and a speed parameter. The speed parameter is indicative of a speed of the rotation of the rotating assembly. A mixture of the fuel and compressed air within the combustion chamber is ignited to start the gas turbine engine.

15 Claims, 4 Drawing Sheets

(56) References Cited

U.S. PATENT DOCUMENTS

| | | | | |
|---|---|---|---|---|
| 2011/0083419 | A1* | 4/2011 | Upadhyay | B01D 46/42 60/264 |
| 2011/0259016 | A1* | 10/2011 | Winston | F02C 7/26 60/778 |
| 2013/0239580 | A1 | 9/2013 | Corson | |
| 2015/0354459 | A1* | 12/2015 | Chen | F23R 3/54 60/737 |
| 2016/0281607 | A1* | 9/2016 | Asati | F02C 7/26 |
| 2020/0006938 | A1* | 1/2020 | Torvund | H02J 3/00 |

* cited by examiner

SYSTEMS AND METHODS FOR STARTING A GAS TURBINE ENGINE

CROSS-REFERENCE TO RELATED APPLICATIONS

This application claims priority to U.S. Provisional Patent Application No. 63/321,631 filed Mar. 18, 2022, which is hereby incorporated herein by reference in its entirety.

BACKGROUND OF THE DISCLOSURE

1. Technical Field

This disclosure relates generally to a gas turbine engine and, more particularly, to starting the gas turbine engine at, for example, high altitude.

2. Background Information

Various systems and methods are known in the art for starting a gas turbine engine at high altitude. While these known engine startup systems and method have various advantages, there is still room in the art for improvement. There is a need in the art, for example, for systems and methods which can facilitate improved engine startup reliability and/or engine startup speed at high altitudes.

SUMMARY OF THE DISCLOSURE

According to an aspect of the present disclosure, an operating method is provided during which a plurality of start parameters for a gas turbine engine are determined. A first of the start parameters is indicative of a temperature of air at an inlet into the gas turbine engine. A second of the start parameters is indicative of a pressure of the air at the inlet. Rotation of a rotating assembly of the gas turbine engine is driven. The rotating assembly includes a compressor rotor and a turbine rotor. The compressor rotor is within a compressor section of the gas turbine engine. The turbine rotor is within a turbine section of the gas turbine engine. Fuel is directed into a combustion chamber of the gas turbine engine based on the start parameters and a speed parameter. The speed parameter is indicative of a speed of the rotation of the rotating assembly. A mixture of the fuel and compressed air within the combustion chamber is ignited to start the gas turbine engine.

According to another aspect of the present disclosure, another operating method is provided during which a plurality of start parameters for a gas turbine engine are determined. A first of the start parameters is indicative of a temperature of air at an inlet into the gas turbine engine. A second of the start parameters is indicative of a pressure of the air at the inlet. Rotation of a rotating assembly of the gas turbine engine is driven based on the start parameters. The rotating assembly includes a compressor rotor and a turbine rotor. The compressor rotor is within a compressor section of the gas turbine engine. The turbine rotor is within a turbine section of the gas turbine engine. Fuel is directed into a combustion chamber of the gas turbine engine based on the start parameters. The air enters the gas turbine engine through the inlet and is compressed by the compressor section to provide to compressed air to the combustion chamber. A mixture of the fuel and the compressed air within the combustion chamber is ignited to start the gas turbine engine.

According to still another aspect of the present disclosure, an engine system is provided for an aircraft. This engine system includes a gas turbine engine, a sensor system, an electric machine, a fuel system and an ignition system. The gas turbine engine includes a rotating assembly, a compressor section, a combustor section, a turbine section and a flowpath extending through the compressor section, the combustor section and the turbine section from an inlet into the gas turbine engine to an exhaust from the gas turbine engine. The rotating assembly includes a compressor rotor and a turbine rotor. The compressor rotor is within the compressor section. The turbine rotor is within the turbine section. The sensor system is configured to determine a plurality of start parameters for the gas turbine engine during a start mode. A first of the start parameters is indicative of a temperature of air at the inlet. A second of the start parameters is indicative of a pressure of the air at the inlet. The electric machine is configured to drive rotation of the rotating assembly during the start mode. The fuel system is configured to direct fuel into a combustion chamber of the combustor section during the start mode based on the start parameters and a speed parameter. The speed parameter is indicative of a speed of the rotation of the rotating assembly. The ignition system is configured to ignite a mixture of the fuel and compressed air within the combustion chamber during the start mode to start the gas turbine engine.

The engine system may also include an auxiliary power unit. The auxiliary power unit may include the gas turbine engine.

The electric machine may be configured to drive rotation of the rotating assembly during the start mode based on the start parameters.

An auxiliary power unit of an aircraft may include the gas turbine engine.

The start parameters may be determined when an aircraft, which includes the gas turbine engine, is at an altitude above twenty-five thousand feet.

The pressure of the air at the inlet may be a static pressure of the air at the inlet.

The pressure of the air at the inlet may be a dynamic pressure of the air at the inlet.

Another one of the start parameters may be indicative of a static pressure of the air at the inlet.

Another one of the start parameters may be indicative of an altitude of an aircraft that includes the gas turbine engine.

Another one of the start parameters may be indicative of a temperature of the gas turbine engine.

The rotation of the rotating assembly may be driven by an electric machine electrically coupled to a power source. Another one of the start parameters may be indicative of electric power available from the power source for powering the electric machine.

The rotation of the rotating assembly may be driven based on one or more of the start parameters.

The operating method may also include: determining a surge control line for the compressor section based on one or more of the start parameters; and operating a surge control valve of the gas turbine engine at the surge control line.

The fuel may be directed into the combustion chamber using an electric fuel pump.

The fuel may be directed into the combustion chamber to control a ratio of the fuel and the compressed air within the combustion chamber independent of a speed of the rotation of the rotating assembly.

The operating method may also include operating one or more ignitors to remove ice buildup on the one or more ignitors. The one or more ignitors may be used to ignite the mixture of the fuel and the compressed air within the combustion chamber.

The rotation of the rotating assembly may be driven at a steady rate during the igniting of the mixture of the fuel and the compressed air. In addition or alternatively, the fuel may be directed into the combustion chamber at a steady rate during the igniting of the mixture of the fuel and the compressed air.

The rotation of the rotating assembly may be driven at a variable rate during the igniting of the mixture of the fuel and the compressed air. In addition or alternatively, the fuel may be directed into the combustion chamber at a variable rate during the igniting of the mixture of the fuel and the compressed air.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

The present disclosure includes systems and method for starting and operating a gas turbine engine. At relatively high altitudes, starting and initial operation of a gas turbine engine may be difficult. For example, at relatively high altitudes (e.g., at or above 25,000 ft or 30,000 ft above sea level, and particularly at or above 35,000 ft, 40,000 ft or more above sea level), a gas turbine engine receives ambient air with a relatively low density and at a relatively high velocity (e.g., due to aircraft movement). The systems and methods of the present disclosure facilitate provision of a certain air-fuel ratio that may improve engine startup reliability and/or engine startup speed at such high altitudes. However, it is also contemplated these systems and methods may also (or alternatively) be used for improving engine startup reliability and/or engine startup speed at low altitudes and/or while an aircraft is on-ground.

Figure 1:
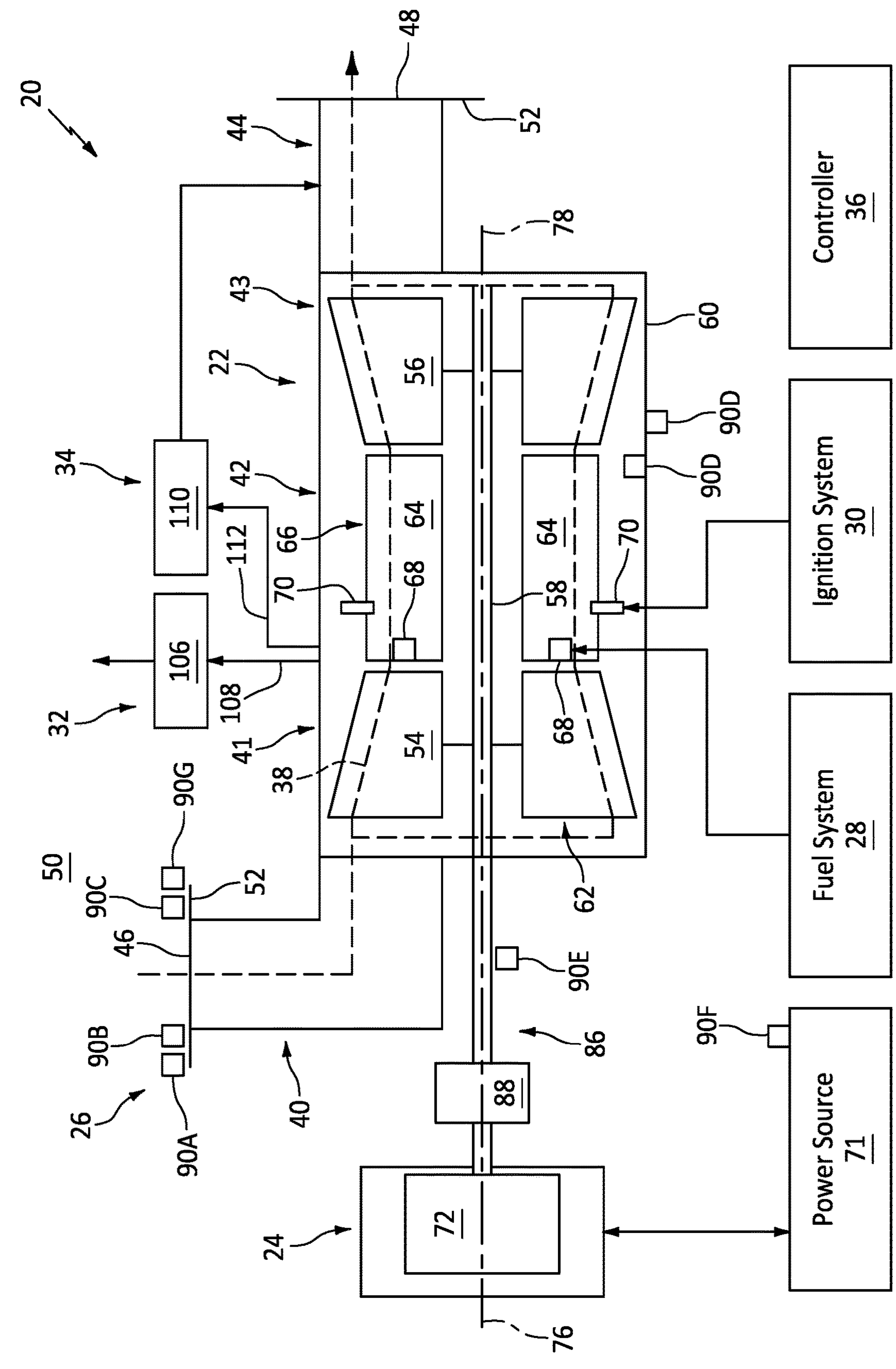
FIG. 1 is a schematic illustration of an engine system for an aircraft.

FIG. 1 illustrates an engine system 20 for an aircraft such as, but not limited to, an airplane. This engine system 20 may be configured as or otherwise included in an auxiliary power unit (APU) for the aircraft. Alternatively, the engine system 20 may be configured as or otherwise included in a propulsion system for the aircraft. Examples of the aircraft propulsion system include, but are not limited to, a turbofan propulsion system, a turbojet propulsion system and an open rotor propulsion system. However, for ease of description, the engine system 20 may be described below as the auxiliary power unit.

The engine system 20 includes a gas turbine engine 22, an electric machine 24, a sensor system 26, a fuel system 28 and an ignition system 30. The engine system 20 may include a bleed system 32 and/or a surge control system 34. The engine system 20 of FIG. 1 also includes a controller 36 (e.g., an auxiliary power control (APC) unit and/or a full authority digital engine control (FADEC) unit) in signal communication (e.g., hardwired and/or wirelessly coupled) with one or more of the engine system members 22, 24, 26, 28, 30, 32 and/or 34; e.g., components and/or sub-systems.

The turbine engine 22 includes an internal flowpath 38 (e.g., a core flowpath), an inlet section 40 (e.g., an inlet duct), a compressor section 41, a combustor section 42, a turbine section 43 and an exhaust section 44 (e.g., an exhaust duct). The flowpath 38 extends sequentially through the inlet section 40, the compressor section 41, the combustor section 42, the turbine section 43 and the exhaust section 44 between an airflow inlet 46 into the turbine engine 22 and a combustion products exhaust 48 from the turbine engine 22. The engine inlet 46 may also be configured as an airflow inlet into the engine system 20 from an environment 50 external to the engine system 20 and, more generally, external to the aircraft. The engine inlet 46 of FIG. 1, for example, is disposed at (e.g., on, adjacent or proximate) and extends through an exterior skin 52 of the aircraft; e.g., a fuselage skin, a nacelle skin, etc. The engine exhaust 48 may also be configured as a combustion products exhaust from the engine system 20 into the external environment 50. The engine exhaust 48 of FIG. 1, for example, is disposed at and extends through the aircraft exterior skin 52. The present disclosure, however, is not limited to such an exemplary arrangement and/or locations of the engine inlet 46 and/or the engine exhaust 48.

The compressor section 41 includes a bladed compressor rotor 54; e.g., a compressor impeller. The turbine section 43 includes a bladed turbine rotor 56; e.g., a turbine impeller. Each of these engine rotors 54 and 56 includes a plurality of rotor blades (e.g., vanes or other airfoils) arranged circumferentially around and connected to at least one respective rotor hub or disk. The rotor blades, for example, may be formed integral with or mechanically fastened, welded, brazed, adhered and/or otherwise attached to the respective rotor hub or disk.

The compressor rotor 54 of FIG. 1 is connected to the turbine rotor 56 and an engine shaft 58. This engine shaft 58 is rotatably supported by an engine housing 60 (e.g., a casing) of the turbine engine 22 through a plurality of bearings (not shown). At least the compressor rotor 54, the turbine rotor 56 and the engine shaft 58 may form an engine rotating assembly 62 of and within the turbine engine 22.

After engine startup and during operation, air enters the turbine engine 22 through the inlet section 40 and its engine inlet 46. The inlet section 40 directs the air from the engine inlet 46 along the flowpath 38 into the compressor section 41. The air entering the flowpath 38 through the engine inlet 46 may be referred to as core air. This core air is compressed by the compressor rotor 54 and directed into a (e.g., annular) combustion chamber 64 within a combustor 66 of the combustor section 42. Fuel is injected into the combustion chamber 64 through one or more fuel injectors 68 and mixed with the compressed core air to provide a fuel-air mixture. This fuel-air mixture is ignited within the combustion chamber 64 by one or more igniters 70, and combustion products thereof flow through the turbine section 43 and cause its turbine rotor 56 to rotate. The rotation of the turbine rotor 56 drives rotation of the compressor rotor 54 and, thus, compression of the air received from the engine inlet 46. The exhaust section 44 receives the combustion products from the turbine section 43. The exhaust section 44 directs these combustion products out of the engine system 20 and its turbine engine 22 through the engine exhaust 48.

Figure 2:
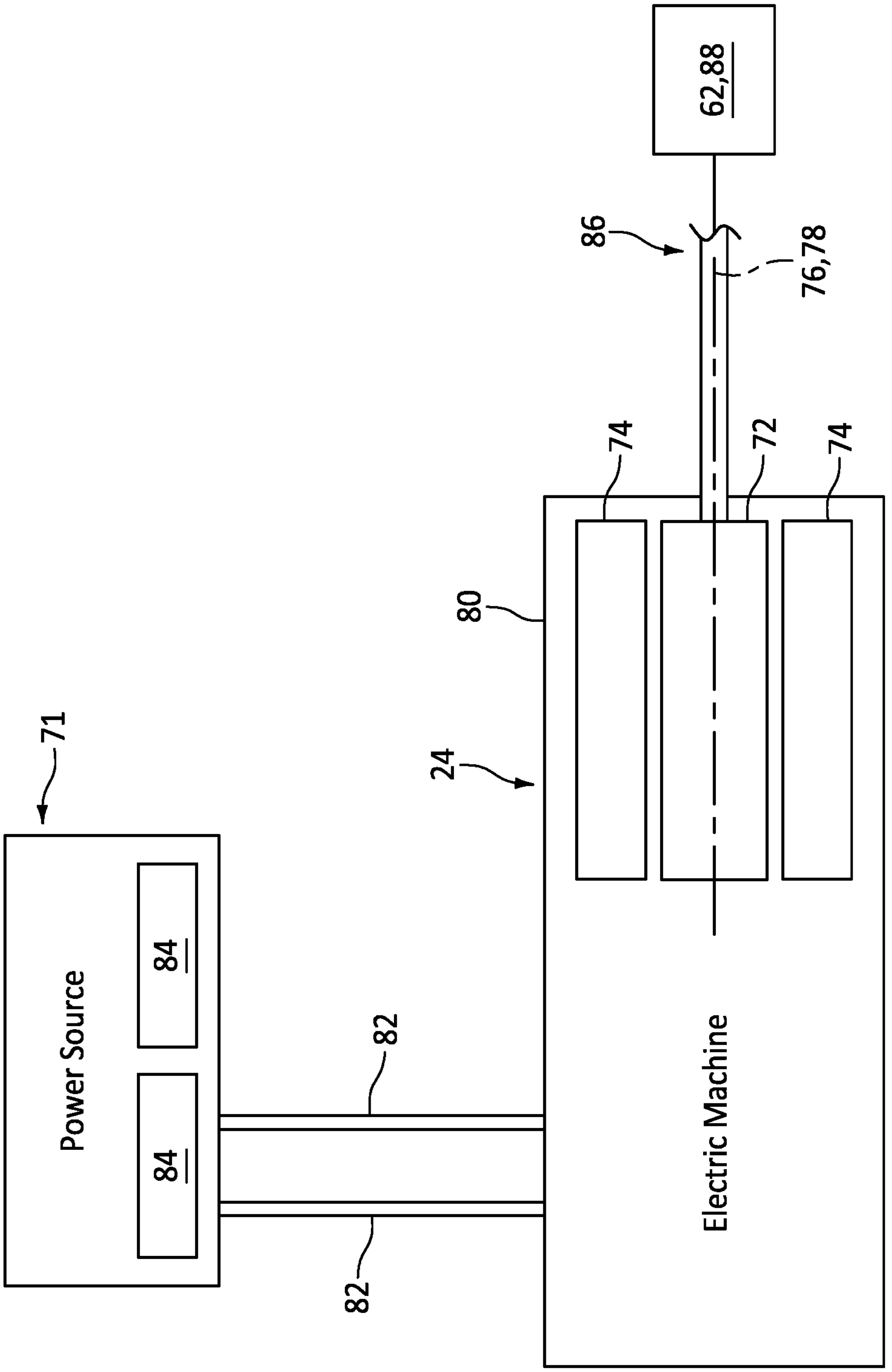
FIG. 2 is a partial schematic illustration of an electric machine coupled with a gas turbine engine and an electric power source.

Referring to FIG. 2, the electric machine 24 may be configurable as an electric motor and/or an electric generator. For example, during a motor mode of operation, the electric machine 24 may operate as the electric motor to convert electricity received from an electric power source 71 into mechanical power. This mechanical power may be provided to the turbine engine 22 (see FIG. 1) to drive rotation of the rotating assembly 62. During a generator mode of operation, the electric machine 24 may be operable as the electric generator to convert mechanical power received from, for example, the turbine engine 22 (see FIG. 1) and its rotating assembly 62 into electricity. This electricity may be utilized for various purposes within the engine system 20 (see FIG. 1) such as, for example, electrically powering one or more electric components of the engine system 20 and/or charging the power source 71. The electricity may also or alternatively be utilized for various purposes outside of the engine system 20 such as, for example, electrically powering one or more electric components in the aircraft, outside of the engine system 20. Of course, in other embodiments, the electric machine 24 may alternatively be configured as a dedicated electric motor (e.g., without the electric generator functionality).

The electric machine 24 of FIG. 2 includes an electric machine rotor 72 and an (e.g., annular) electric machine stator 74. The machine stator 74 may be radially outboard of and circumscribe the machine rotor 72. The electric machine 24, however, is not limited to such an exemplary rotor-stator configuration. The machine rotor 72, for example, may alternatively be axially next to or radially outboard of and circumscribe the machine stator 74. The machine rotor 72 of FIG. 2 is rotatable about a rotational axis 76 of the machine rotor 72, which rotational axis 76 may also be an axial centerline of the electric machine 24. The rotational axis 76 may (or may not) be parallel with (e.g., coaxial with or offset from) a rotational axis 78 of the rotating assembly 62. The electric machine 24 also includes an electric machine case 80 that at least partially or completely houses the machine rotor 72 and the machine stator 74.

The power source 71 is electrically coupled with the electric machine 24 through one or more electrical leads 82; e.g., high voltage lines. The power source 71 is configured to store electricity. The power source 71 is also configured to provide the stored electricity to the electric machine 24 and/or receive electricity from the electric machine 24; e.g., during power source recharging. The power source 71, for example, may be configured as or otherwise include one or more electricity storage devices 84; e.g., batteries, fuel cells, etc.

Referring to FIG. 1, the electric machine 24 is operatively coupled to the turbine engine 22. The machine rotor 72 of FIG. 1, for example, is coupled to the rotating assembly 62 through a drivetrain 86. This drivetrain 86 may be a geared drivetrain where the drivetrain 86 facilitates rotation of the rotating assembly 62 at a different (e.g., faster) speed than the machine rotor 72. The drivetrain 86, for example, may be configured as or otherwise include a geartrain 88 (e.g., a gearbox, a transmission, etc.) coupled between the machine rotor 72 and the rotating assembly 62 and its engine shaft 58. Alternatively, the drivetrain 86 may be a direct-drive drivetrain where the drivetrain 86 facilitates rotation of the rotating assembly 62 and the machine rotor 72 at a common (the same) speed. The drivetrain 86, for example, may be configured as or otherwise include a driveshaft coupled between the machine rotor 72 and the rotating assembly 62 and its engine shaft 58. The present disclosure, however, is not limited to the foregoing exemplary couplings between the electric machine 24 and the turbine engine 22.

The sensor system 26 is configured to measure one or more environmental and/or operational parameters for operation of the engine system 20. Examples of these parameters include, but are not limited to: a temperature of air at the engine inlet 46; a static pressure of the air at the engine inlet 46; a dynamic pressure of the air at the engine inlet 46; an altitude of the engine system 20 (e.g., an altitude of the aircraft); a temperature of the turbine engine 22; a power level of the power source 71; and/or a rotational speed of the rotating assembly 62. The parameters measured at the engine inlet 46 (e.g., inlet condition parameters) may be measured in, adjacent or proximate the engine inlet 46, for example just inside of or outside of the inlet section 40. The temperature of the turbine engine 22 may be indicative of a temperature of the engine housing 60 and/or a temperature of components along the flowpath 38 within the turbine engine 22 and its engine housing 60. One or more of the measured parameters may be measured using one or more sensors 90A-G (generally referred to as "90") of the sensor system 26. Examples of the sensors 90 include, but are not limited to, a static pressure sensor (e.g., 90A), a dynamic pressure sensor (e.g., 90B), an air temperature sensor (e.g., 90C), an engine temperature sensor (e.g., 90D), a rotational speed sensor (e.g., 90E), a current and/or voltage sensor (e.g., 90F), and/or an altimeter sensor (e.g., 90G).

Figure 3:
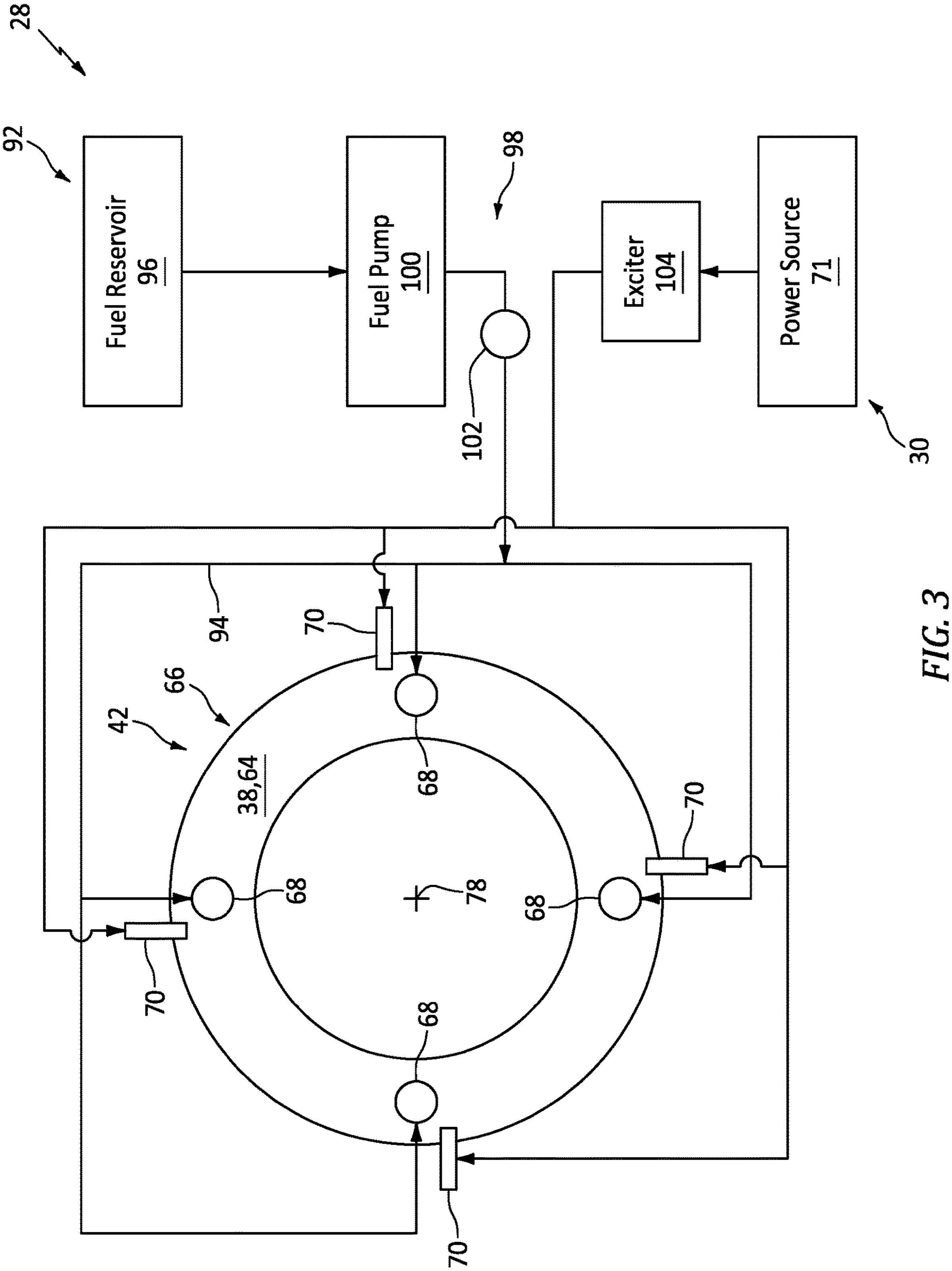
FIG. 3 is a partial schematic illustration of a combustor section of the turbine engine with a fuel system and an ignition system.

Referring to FIG. 3, the fuel system 28 includes a fuel source 92, the one or more fuel injectors 68 and a fuel circuit 94 to deliver fuel from the fuel source 92 to the fuel injectors 68. The fuel source 92 of FIG. 3 includes a fuel reservoir 96 and/or a fuel flow regulator 98. The fuel reservoir 96 is configured to store the fuel before, during and/or after turbine engine operation. The fuel reservoir 96, for example, may be configured as or otherwise include a tank, a cylinder, a pressure vessel, a bladder or any other type of fuel storage container. The fuel flow regulator 98 is configured to direct and/or meter a flow of the fuel from the fuel reservoir 96 to one or more or all of the fuel injectors 68. The fuel flow regulator 98, for example, may be configured as or otherwise include a fuel pump 100 such as an electric fuel pump. The fuel flow regulator 98 may also include a control valve 102 between the fuel pump 100 and the fuel circuit 94. With this arrangement, the fuel pump 100 may be operated to pressurize a fuel line with the control valve 102 closed. The control valve 102 may then be partially or fully opened to provide (e.g., substantially instantaneous) partial or full fuel flow to the fuel injectors 68 through the fuel circuit 94. The fuel injectors 68 may be arranged circumferentially about the rotational axis 78 in an array; e.g., a circular array. Each fuel injector 68 is configured to direct the fuel received from the fuel source 92 through the fuel circuit 94 into the combustion chamber 64 for combustion. The fuel injectors 68 may include one or more simplex fuel injectors and/or one or more duplex fuel injectors; e.g., injectors with primary and secondary fuel circuits.

At least some components of the fuel system 28 may be mounted at a bottom of a bay for the turbine engine 22 within an aircraft structure. At least some components of the fuel system 28 may also or alternatively be arranged near a (e.g., daily) access door into the aircraft structure to facilitate, for example, fuel system component maintenance; e.g., fuel filter maintenance.

The ignition system 30 includes an exciter 104 and the one or more igniters 70. The exciter 104 is electrically coupled with and between the power source 71 (or another power source) and the igniters 70. The exciter 104 is configured to direct, regulate and/or amplify electric current flowing from the power source 71 to the igniters 70. The igniters 70 may be arranged circumferentially about the rotational axis 78 in an array; e.g., a circular array. Each igniter 70 is configured to convert the electric current received from the exciter 104 into spark(s) for igniting the fuel-air mixture within the combustion chamber 64.

Referring to FIG. 1, the bleed system 32 includes a bleed valve 106 (or multiple bleed valves) fluidly coupled with a bleed system circuit 108. The bleed system circuit 108 fluidly couples one or more bleed system orifices along the flowpath 38 to the bleed valve 106. The bleed system orifices may be arranged between the compressor section 41 and the combustor 66. The bleed system orifices, for example, may be arranged along a diffuser leading to the combustor 66 and/or along a plenum surrounding the combustor 66. With such an arrangement, the bleed system 32 may bleed compressed air from the flowpath 38 during regular (e.g., non-startup) turbine engine operation for provision to one or more other devices and/or systems of the aircraft (e.g., an environmental system, an aircraft propulsion system for startup, etc.) through the bleed valve 106.

The surge control system 34 includes a surge control valve 110 (SCV) fluidly couple with a surge control circuit 112. The surge control circuit 112 fluidly couples one or more surge control system orifices along the flowpath 38 to the surge control valve 110. The surge control system orifices may be arranged between the compressor section 41 and the combustor 66. The surge control system orifices, for example, may be arranged along the diffuser leading to the combustor 66 and/or along the plenum surrounding the combustor 66. With such an arrangement, the surge control system 34 may bleed compressed air from the flowpath 38 during startup and/or regular turbine engine operation to prevent and/or mitigate compressor surge. The air bled by the surge control system 34 when the surge control valve 110 is partially or completely opened may be exhausted into the exhaust section 44. Alternatively, the bleed air may be exhausted directly into the external environment 50 or elsewhere.

The controller 36 may be implemented with a combination of hardware and software. The hardware may include memory and at least one processing device, which processing device may include one or more single-core and/or multi-core processors. The hardware may also or alternatively include analog and/or digital circuitry other than that described above.

The memory is configured to store software (e.g., program instructions) for execution by the processing device, which software execution may control and/or facilitate performance of one or more operations such as those described below. The memory may be a non-transitory computer readable medium. For example, the memory may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

The controller 36 is described above and shown in FIG. 1 as a system controller. The controller 36 of FIG. 1, for example, is configured to control and/or facilitate operation of each of the engine system members 22, 24, 26, 28, 30, 32 and/or 34. However, it is contemplated one or more of the engine system members 22, 24, 26, 28, 30, 32 and/or 34 may alternatively be provided with its own dedicated sub-controller, where those sub-controllers communicate with one another and/or are overseen by a common master controller.

Figure 4:
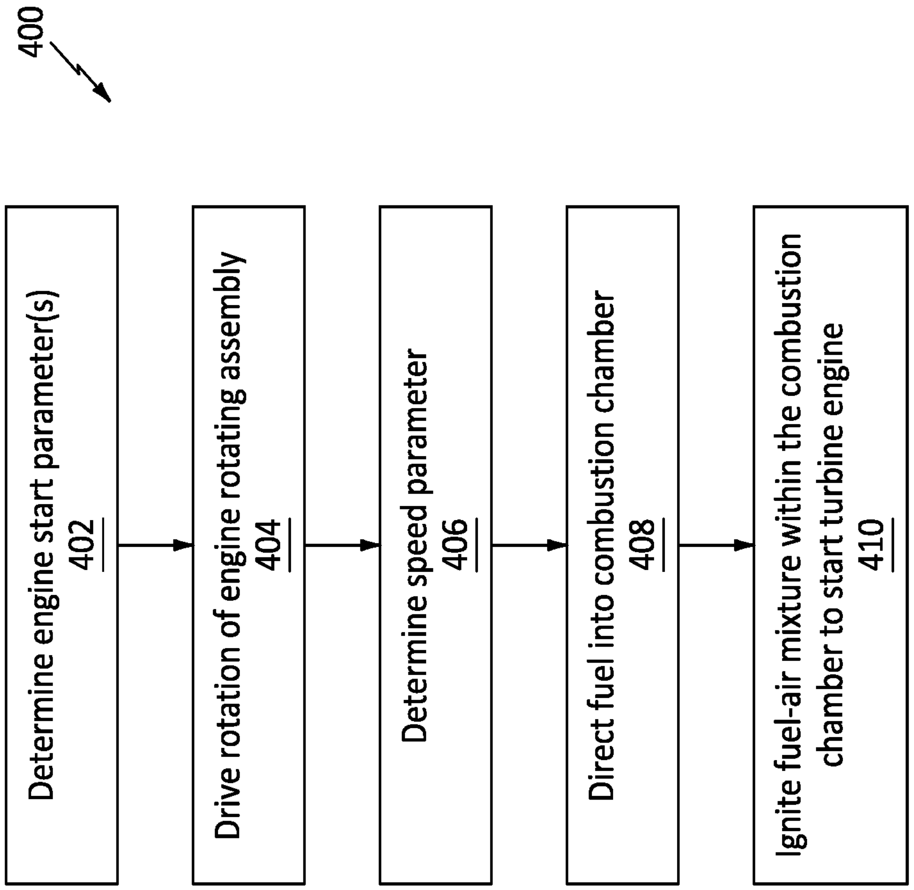
FIG. 4 is a flow diagram of a method for operating an engine system.

FIG. 4 is a flow diagram of an operating method 400 for an engine system. For ease of description, the operating method 400 is described below with respect to the engine system 20 of FIGS. 1-3. At the start of this operating method 400, the turbine engine 22 is non-operational; e.g., turned off, flamed out, etc. The present disclosure, however, is not limited to operating such an exemplary engine system nor such an exemplary turbine engine as shown in FIGS. 1-3.

In step 402, one or more engine start parameters are determined. These start parameters may include any one or more of the environmental and/or operational parameters used for startup of the turbine engine 22; e.g., measured and processed to facilitate turbine engine startup. The start parameters, for example, may include or otherwise be indicative of one or more inlet conditions at the engine inlet 46. These inlet conditions may include: the temperature of the air at the engine inlet 46; the static pressure of the air at the engine inlet 46; and/or the dynamic pressure of the air at the engine inlet 46. The start parameters may also include or otherwise be indicative of one or more other parameters such as, but not limited to: the altitude of the engine system 20; the temperature of the turbine engine 22 (e.g., on and/or inside of the engine housing 60); and/or the power level of the power source 71 available for operating the electric machine 24 during the turbine engine startup. The start parameters may be measured using the sensor system 26 and one or more of its sensors 90. Sensor data including or otherwise indicative of the measured start parameters may then be communicated to the controller 36 for processing.

In step 404, the rotating assembly 62 is rotated using the electric machine 24. The controller 36, for example, may process the sensor data to determine an electric machine command. More particularly, the controller 36 may process one or more of the start parameters to determine how fast to rotate the rotating assembly 62 using the electric machine 24 to facilitate (e.g., optimal) starting of the turbine engine 22 for that given set of start parameters. This processing may involve using one or more lookup tables and/or models. By rotating the rotating assembly 62, the compressor rotor 54 compresses the air entering the compressor section 41. Increasing the rotational speed of the rotating assembly 62 increases air compression, and decreasing the rotational speed of the rotating assembly 62 decreases air compression. With this in mind, the controller 36 determines which speed to rotate the rotating assembly 62 based on, for example, the air temperature and the air pressure (e.g., static and/or dynamic) at the engine inlet 46 since air temperature and pressure directly affect air compression. The controller 36 may also determine the speed to rotate the rotating assembly 62 based on altitude since altitude relates to density of the air being directed into the compressor rotor 54 for compression. Once the rotating assembly rotational speed is determined, the controller 36 provides the electric machine command to the electric machine 24 and the electric machine 24 drives rotation of the rotating assembly 62 to (or about) the determined rotational speed. Here, the controller 36 may facilitate a closed loop feedback control of the rotational speed of the rotating assembly 62.

In step 406, the speed parameter is determined. This speed parameter is indicative of the rotational speed of the rotating assembly 62. The speed parameter may be computationally determined based on the processing during the step 404.

Alternatively, the speed parameter may be measured using the sensor system 26 and its sensor 90E. Where the speed parameter is measured, additional sensor data including or otherwise indicative of the measured rotational speed of the rotating assembly 62 is then communicated to the controller 36 for processing.

In step 408, the fuel is directed into the combustion chamber 64 for mixing with the air compressed by the compressor section 41. The controller 36, for example, may process the various sensor data to determine a fuel system command. More particularly, the controller 36 may process one or more of the start parameters as well as the speed parameter to determine how much fuel to inject into the combustion chamber 64 using the fuel system 28 for that given set of parameters. A flowrate and/or a pressure of the fuel is selected to facilitate provision of a (e.g., optimal) fuel-air ratio for the particular set of starting conditions—the given set of parameters. The processing may involve using one or more lookup tables and/or models. Once the fuel flow is determined, the controller 36 provides the fuel system command to the fuel system 28 and the fuel pump 100 directs (e.g., pumps) the fuel from the fuel source 92 to the fuel injectors 68 for injection at the determined fuel flow. Note, by utilizing an electric fuel pump as the fuel pump 100, the fuel flow may be independent of/divorced from/not directly tied to the rotational speed of the rotating assembly 62. Thus, the fuel flow may be increased or decreased to particularly suit, for example, the inlet conditions for the specific altitude and/or rotational speed. Moreover, the fuel pump 100 may anticipate and/or act simultaneously with the operation of the electric machine 24. By contrast, a mechanical pump may be directly tied to rotation of a rotating assembly and, thus, coming up to pressure may be slow and delayed.

In step 410, the fuel-air mixture within the combustion chamber 64 is ignited using the ignition system 30. The controller 36, for example, may signal the ignition system 30 to generate ignition sparks within the combustion chamber 64. These ignition sparks may begin concurrently with the delivery of the fuel into the combustion chamber 64, or slightly before or after the delivery of the fuel. During this ignition step 410 (or prior to the ignition step), the controller 36 may also signal the ignition system 30 to prepare for the combustion process. The exciter 104, for example, may direct one or more high intensity pulses of electric current to the igniters 70 to remove (e.g., clear, blast off, etc.) any ice buildup on the igniters 70.

In addition to the foregoing, the compressor section 41 may be operated at or close to its surge control line (e.g., a surge line) during part or all of the engine startup process. This surge control line may represent a minimum operable flowrate of the compressor section 41 over a range of rotational speeds. A surge event may be triggered by stalled flow conditions within the compressor section 41, where the surge control line may extend along a threshold to such stalled flow conditions. By operating at or close to the surge control line, it has been found that engine startup reliability and/or engine startup speed at high altitudes may be improved. However, the surge control line may vary depending upon various parameters including the inlet conditions at the engine inlet 46. The controller 36 may therefore determine the surge control line based on one or more of the start parameters; e.g., the inlet conditions. The processing may involve using one or more lookup tables and/or models. The controller 36 may facilitate operation at or close to the surge control line by: further tailoring the rotational speed of the rotating assembly 62; and/or by selectively opening the surge control valve 110 to bleed off compressed air from the flowpath 38.

In some embodiments, the electric machine 24 may drive rotation of the rotating assembly 62 at a steady rate during the ignition of the fuel-air mixture. In other embodiments, the electric machine 24 may drive rotation of the rotating assembly 62 at a variable rate during the ignition of the fuel-air mixture. This variable rate may be an increasing rate, a decreasing rate or a fluctuating (e.g., up-and-down) rate. For example, the rotational speed may be controlled to accelerate, decelerate and/or dwell at one or more specific speeds during the turbine engine startup—a start window. The selection of these speeds may be selected using the closed loop feedback to take into account various factors throughout the engine startup sequence such as, the altitude and/or the inlet conditions.

In some embodiments, the fuel system 28 may direct the fuel into the combustion chamber 64 at a steady rate during the ignition of the fuel-air mixture. In other embodiments, the fuel system 28 may direct the fuel into the combustion chamber 64 at a variable rate during the ignition of the fuel-air mixture. This variable rate may be an increasing rate, a decreasing rate or a fluctuating (e.g., up-and-down) rate. The fuel flow may be varied as the rotating assembly 62 is brought up to speed to facilitate improved (e.g., optimal) fuel-air ratio, which may reduce rotating assembly start speed and/or shorten the engine startup time.

Following the startup of the turbine engine 22, the controller 36 may signal the bleed system 32 to provide bleed air to one or more other devices and/or systems of the aircraft to facilitate operation of those devices and/or systems. The bleed system 32, for example, may direct bleed air from the turbine engine 22 to facilitate startup of a gas turbine engine for an aircraft propulsion system; e.g., where the engine system 20 is part of an auxiliary power unit or a companion engine propulsion system.

In some embodiments, a passive bleed common may be used for radial compressor(s). This passive bleed common may facilitate low speed combustion starting to follow just off of (e.g., within 2%, 5% or 10% of) the surge control line for increased (e.g., maximum) performance and/or efficiency. The controller 36 may thereby select a certain start sequence for (e.g., any) emergency inlet condition and/or reduce the engine startup time of bringing the auxiliary power unit ready to load for starting one or more main engine(s); e.g., propulsion system engines.

In some embodiments, the combustor 66 may be configured for improved and/or even combustion with a goal pattern factor (PF). The combustor 66 may also be paired with duplex nozzles, which may facilitate quick and/or consistent starting of the main engine(s) when needed.

In some embodiments, the lookup tables and/or the models used by the controller 36 may be developed using a numerical propulsion system simulation (NPSS) model. This NPSS model may model startup operation of the turbine engine 20 for various different operating conditions; e.g., different air temperature, different air pressures, different altitudes, etc. The NPSS model may thereby optimize the turbine engine startup procedure based on the inlet conditions, altitude and/or other parameters discussed above.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An operating method, comprising:

determining a plurality of start parameters for a gas turbine engine for an aircraft, the gas turbine engine including a flowpath that extends from an engine inlet into the gas turbine engine, through a compressor section of the gas turbine engine and a turbine section of the gas turbine engine, to an exhaust from the gas turbine engine, a first of the plurality of start parameters indicative of a temperature of air at the engine inlet into the gas turbine engine, a second of the plurality of start parameters indicative of a dynamic pressure of the air at the engine inlet, and a third of the plurality of start parameters is indicative of an altitude of the aircraft, wherein the dynamic pressure of the air at the engine inlet is measured using a sensor located outside of the flowpath, and wherein another one of the plurality of start parameters comprises a static pressure of the air outside of the engine inlet;

driving rotation of a rotating assembly of the gas turbine engine, the rotating assembly including a compressor rotor and a turbine rotor, the compressor rotor within the compressor section of the gas turbine engine, and the turbine rotor within the turbine section of the gas turbine engine, wherein the rotation of the rotating assembly is driven based on the plurality of start parameters;

directing fuel into a combustion chamber of the gas turbine engine based on the plurality of start parameters and a speed parameter, the speed parameter indicative of a speed of the rotation of the rotating assembly; and igniting a mixture of the fuel and compressed air within the combustion chamber to start the gas turbine engine;

wherein the fuel is directed into the combustion chamber at a variable rate during the igniting of the mixture of the fuel and the compressed air.

2. The operating method of claim 1, wherein an auxiliary power unit of the aircraft comprises the gas turbine engine.

3. The operating method of claim 1, wherein the plurality of start parameters are determined when the aircraft comprising the gas turbine engine is at an altitude above twenty-five thousand feet.

4. The operating method of claim 1, wherein another one of the plurality of start parameters is indicative of a temperature of the gas turbine engine.

5. The operating method of claim 1, wherein the rotation of the rotating assembly is driven by an electric machine electrically coupled to a power source; and another one of the plurality of start parameters is indicative of electric power available from the power source for powering the electric machine.

6. The operating method of claim 1, further comprising:

determining a surge control line for the compressor section based on one or more of the plurality of start parameters; and operating a surge control valve of the gas turbine engine at the surge control line.

7. The operating method of claim 1, wherein the fuel is directed into the combustion chamber using an electric fuel pump.

8. The operating method of claim 1, wherein the fuel is directed into the combustion chamber to control a ratio of the fuel and the compressed air within the combustion chamber independent of a speed of the rotation of the rotating assembly.

9. The operating method of claim 1, further comprising operating one or more ignitors to remove ice buildup on the one or more ignitors, wherein the one or more ignitors are used to ignite the mixture of the fuel and the compressed air within the combustion chamber.

10. The operating method of claim 1, wherein at least one of the rotation of the rotating assembly is driven at a steady rate during the igniting of the mixture of the fuel and the compressed air.

11. The operating method of claim 1, wherein the rotation of the rotating assembly is driven at a variable rate during the igniting of the mixture of the fuel and the compressed air.

12. The operating method of claim 1, wherein the plurality of start parameters are determined when an aircraft comprising the gas turbine engine is at an altitude above thirty-five thousand feet.

13. The operating method of claim 1, wherein the plurality of start parameters are determined when an aircraft comprising the gas turbine engine is at an altitude above forty thousand feet.

14. The operating method of claim 1, wherein an inlet section of the gas turbine engine is arranged between the engine inlet into the gas turbine engine and the compressor section of the gas turbine engine.

15. An operating method, comprising:

determining a plurality of start parameters for a gas turbine engine, a first of the plurality of start parameters indicative of a temperature of air at an engine inlet into the gas turbine engine, a second of the plurality of start parameters indicative of a dynamic pressure of the air at the engine inlet, a third of the plurality of start parameters comprising a static pressure of the air outside of the engine inlet, and the temperature of air at the engine inlet and the dynamic pressure of the air at the engine inlet are measured outside of the engine inlet;

driving rotation of a rotating assembly of the gas turbine engine based on the plurality of start parameters, the rotating assembly including a compressor rotor and a turbine rotor, the compressor rotor within a compressor section of the gas turbine engine, and the turbine rotor within a turbine section of the gas turbine engine;

directing fuel into a combustion chamber of the gas turbine engine based on the plurality of start parameters, wherein the air enters the gas turbine engine through the engine inlet and is compressed by the compressor section to provide compressed air to the combustion chamber; and igniting a mixture of the fuel and the compressed air within the combustion chamber to start the gas turbine engine, wherein the rotation of the rotating assembly is driven at a steady rate during the igniting of the mixture of the fuel and the compressed air, and the fuel is directed into the combustion chamber at a steady rate during the igniting of the mixture of the fuel and the compressed air.

* * * * *